United States Patent Office 2,704,751
Patented Mar. 22, 1955

2,704,751

ALPHA-UREIDOMETHYL ACRYLONITRILES AND POLYMERS THEREOF

Harry W. Coover, Jr., and Joseph B. Dickey, Kingsport, Tenn., assignors to Eastman Kodak Company, Rochester, N. Y., a corporation of New Jersey No Drawing. Application July 15, 1953, Serial No. 368,214

12 Claims. (Cl. 260—77.5)

This invention relates to alpha-ureidomethyl acrylonitriles, to polymers thereof, and to a process for their preparation.

This application is a continuation-in-part of our copending application Serial No. 218,266, filed March 29, 1951 (now U. S. Patent No. 2,659,715, dated November 17, 1953).

The new compounds of the invention are represented by the following general structural formula:

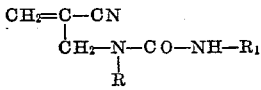

wherein R represents an atom of hydrogen or the group —CO—NH—$R_1$, and $R_1$ represents an atom of hydrogen or an alkyl group containing from 1 to 4 carbon atoms (e. g. methyl, ethyl, propyl, butyl, etc. groups) or an aryl group (e. g. phenylor tolyl groups). The new compounds of the invention above defined are homo and copolymerizable to resinous products which are characterized, by improved solubility in common organic solvents such as acetone, acetic acid, acetonitrile etc., when compared to corresponding polymers of acrylonitrile, and which can be readily spun into fibers having improved dyeing properties.

It is, accordingly, an object of the invention to provide new derivatives of methacrylonitrile. Another object is to provide resinous polymers of the same. Another object is to provide a process for preparing the new compounds and polymers thereof. Other objects will become apparent hereinafter.

In accordance with the invention, we prepare the new monomeric compounds by condensing alpha-aminomethyl acrylonitrile with an alkyl or aryl isocyanate. Advantageously, the reaction can be carried out in an inert diluent such as water, ether, etc. The reaction is promoted by the presence of an acid such as hydrochloric acid. Suitable isocyanates include sodium or potassium isocyanate, methylisocyanate, ethylisocyanate, butylisocyanate, isobutylisocyanate, phenylisocyanate, p-tolyl isocyanate, etc. and corresponding alkali-metal derivatives. However, any organic or inorganic oxygen or sulfur isocyanate can be employed. Generally, the reaction is started at about 0° C. and when the reactants are added together completely, the temperature is allowed to rise to room temperature although temperatures up to about 50° C., and even higher, can be employed to complete the reaction. To obtain those of our compounds which contain a single —CO—NH—$R_1$ group, we react approximately equimolar quantities of alpha-aminomethyl acrylonitrile and the particular isocyanate desired. However, to obtain those of our compounds which contain two —CO—NH—$R_1$ groups, we react two or more gram-moles of the isocyanate with each gram-mole of alpha-aminomethyl acrylonitrile. * Mixxtures of isocyanates can also be used to obtain mixed alpha-ureidomethyl acrylonitriles, i. e., in the latter process. The products can be isolated from the reaction mixture by the usual methods for isolation of product such as distillation and crystallization. If desired, the process can be carried out in continuous manner, for example, by adding the reactants to the reaction mixture by suitable means such as through the still column and withdrawing the product as formed.

The polymerization of the new compounds of the invention alone or conjointly with one or more other unsaturated organic compounds is accelerated by heat, by actinic light and by polymerization catalysts which are known to promote the polymerization of vinyl and other unsaturated organic compounds such as peroxides, e. g., benzoyl peroxide, acetyl peroxide, layroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali-metal perborates, the water-soluble salts of percarbonic acid, the water-soluble salts of perphosphoric acid, etc. The organic peroxides are especially suitable. Mixtures of catalysts can be employed. An activating agent as sodium bisulfite can be used, if desired, in conjunction with the polymerization catalysts.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantageous. The monomer or mixture of monomers can be advantageously emulsified in the water using emulsifying agents such as salts of higher fatty acids (e. g., sodium or potassium stearate, paimitate, etc.), ordinary soaps, salts of higher fatty alcohol sulfates (e. g., sodium or potassium cetyl sulfate, sodium or potassium lauryl sulfate, sodium or potassium stearyl sulfate, etc.), salts of aromatic sulfonic acids (e. g., sodium or potassium salts of alkylnaphthalene sulfonic acids, etc.) and higher molecular weight quaternary ammonium salts (e. g., dimethyl benzylphenyl ammonium chloride, etc.). For bead or granular polymerization relatively poor dispersing agents such as starch, methylated starch, gum arabic, polyvinyl alcohol, partly hydrolyzed polyvinyl acetate, gelatin, sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures. Continuous methods of polymerization can also be employed.

The new monomers of the invention readily copolymerize with each other in any proportions or with one or more other polymerizable unsaturated compounds containing the basic vinyl group $CH_2=CH$— to give high molecular weight resinous polymers, for example, any of the new compounds with vinyl esters of carboxylic acids (e. g., vinyl acetate, vinyl butyrate, vinyl stearate, vinyl trifluoroacetate, vinyl benzoate, etc.) vinyl alkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters, etc.). Other unsaturated compounds which can be copolymerized with our new monomers include methacrylic acid and its anhydride, amide, N-alkyl amides, nitrile, and the methyl, ethyl, butyl, benzyl and phenyl esters, vinylidene dichloride, vinylidene chloride-fluoride, alkyl esters of maleic and fumaric acids such as methyl maleate, methyl fumarate, fumaronitrile, cis- and trans-β-cyano and carboxamidomethyl acrylate, and the like. The polymers and copolymers of the invention are soluble in one or more volatile solvents such as acetone, methyl ethyl ketone, acetonitrile, dimethyl foramide, dimethylacetamide, etc.

The copolymers of the invention can contain variable amounts of each comonomer and are obtained with starting polymerization mixtures containing from 5 to 95% by weight of the new unsaturates and from 95% to 5% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C. However, the preferred temperature range for the polymerizations is from 25° C. to 130° C. Where the polymerization is carried out in an inert solvent or in suspension in a nonsolvent, the monomers advantageously constitute from 5% to 50% by weight of the mixture.

The following examples will serve to illustrate further our new unsaturates, polymers thereof, and the manner of preparing the same.

*Example 1.—Alpha-ureidomethyl acrylonitrile*

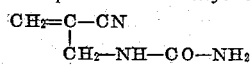

124 g. of alpha-acetaminomethyl acrylonitrile were stirred at room temperature, with the exclusion of air, in a mixture of 1000 cc. of water and 200 cc. of 35% hydrochloric acid, in the presence of hydroquinone. The mixture was gently warmed to complete the hydrolysis. It was then neutralized with sodium bicarbonate, extracted with ether, dried and distilled under reduced pressure to give the intermediate compound, alpha-aminomethyl acrylonitrile, a colorless liquid B. P. 49-53° C./3 mm. pressure.

7.2 g. of alpha-aminomethyl acrylonitrile prepared as above described were dissolved in 200 cc. of water containing 15 cc. of 35% hydrochloric acid and 0.1 mol of sodium isocyanate added at 0° C. The reaction mixture was allowed to warm to room temperature, the excess of acid neutralized with sodium bicarbonate and water removed under reduced pressure. The product, alpha-ureidomethyl acrylonitrile, was a white solid which on analysis gave 33.2% by weight of nitrogen compared with calculated theory of 33.6% of nitrogen.

The intermediate alpha-acetaminomethyl acrylonitrile used in the above example was prepared as follows: 50 g. of acetamide were dissolved in 200 cc. of dry peroxide-free 1,4-dioxane in a 1-liter flask provided with a reflux condenser, a dropping funnel and a gas inlet tube. Nitrogen was passed through the flask to remove oxygen, then 2.3 g. of sodium were added and the reaction mixture was warmed to complete the formation of the intermediate N-sodium acetamide. Then 14.6 g. of alpha-bromomethyl acrylonitrile were added dropwise, with stirring, at about 0° C. The reaction mixture was then warmed to complete the reaction and the sodium bromide which formed was filtered off. The filtrate was fractionally distilled under reduced pressure to give a colorless compound, alpha-acetaminomethyl acrylonitrile, B. P. 120–123° C./0.5 mm. pressure.

*Exemple 2.—Alpha-N-methylureidomethyl acrylonitrile*

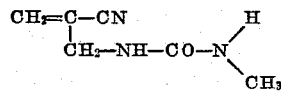

7.2 g. of alpha-aminomethyl acrylonitrile were dissolved in 50 cc. of ether and 0.1 mol of methylisocyanate added dropwise. The ether was then removed by distillation. The product, alpha-N-methylureidomethyl acrylonitrile, had a boiling point of 130°–133° C. at less than 0.1 mm. pressure. In similar manner any organic or inorganic oxygen or sulfur isocyanate can be reacted, for example, $(CH_3)_3SiNCO$, to give the corresponding N-substituted ureidomethyl acrylonitriles.

*Example 3.—Alpha-N-ethylureidomethylacrylonitrile*

One-tenth mole of alpha-aminomethylacrylonitrile was dissolved in 50 cc. of ether and 0.1 mole of ethylisocyanate was added dropwise. The ether was removed and the product purified by distillation, B. P. 116–118 at 0.03 mm.

*Example 4.—Alpha-N-butylureidomethylacrylonitrile*

One-tenth mole of alpha-aminomethylacrylonitrile was dissolved in 50 cc. ether containing a trace of hydroquinone and 0.1 mole of butylisocyanate was added dropwise. The ether was removed and the product purified by distillation, B. P. 124–127 at 0.03 mm.

*Example 5.—Alpha-N-isopropylureidomethylacrylonitrile*

One-tenth mole of α-aminomethylacrylonitrile was dissolved in 50 cc. of ether containing a trace of hydroquinone, and 0.1 mole of isopropylisocyanate was added dropwise. After the addition of the isopropylisocyanate was completed, the product was purified by distillation, B. P. 119–121 at 0.03 mm.

*Example 6*

5 g. of alpha-ureidomethyl acrylonitrile were dissolved in 50 cc. of water containing 0.2 g. of ammonium persulfate. Polymerization was completed by heating at 70° C. for 48 hours. A clear, viscous solution was obtained.

*Example 7*

5 g. of alpha-N-methylureidomethylacrylonitrile and 0.2 g. benzoyl peroxide were placed in a sealed tube and heated at 100° C. for 48 hours. A clear, hard polymer soluble in dimethylformamide was obtained.

*Example 8*

9 g. of styrene, 1 g. of alpha-N-ethylureidomethylacrylonitrile and 0.2 g. of benzoyl peroxide were placed in a sealed tube and heated at 80° C. for 24 hours. A clear, hard polymer soluble in acetone was obtained.

*Example 9*

9 g. of alpha-N-butylureidomethylacrylonitrile, 1 g. of methylmethacrylate and 0.2 g. of lauroyl peroxide were heated at 90° C. for 30 hours. A clear, hard polymer soluble in acetonitrile was obtained.

*Example 10*

5 g. of alpha-N-isopropylureidomethylacrylonitrile, 5 g. of vinyl acetate, 0.2 g. of ammonium persulfate, 0.2 g. of sodium bisulfite and 2 g. of potassium laurate were added to 100 ml. distilled water. Polymerization was complete within 8 hours. 10 cc. of a saturated salt solution was added to precipitate the polymer. The polymer was filtered, washed and dried. The polymer is soluble in such solvents as acetone, methyl ethyl ketone and acetonitrile.

*Example 11*

1 g. of alpha-N-ethylureidomethylacrylonitrile, 1 g. of alpha-N-isopropylureidomethylacrylonitrile, 8 g. of vinyl chloride, 0.2 g. of ammonium persulfate, 0.1 g. of sodium bisulfite and 2 g. of potassium laurate were added to 100 ml. of distilled water in a pressure bottle. The reaction mixture was warmed up to room temperature and polymerization was complete within 8 hours. The polymer was precipitated by the addition of a saturated salt solution. The precipitated polymer was filtered, washed and dried. The polymer has a softening point above 80° C. and is readily soluble in such solvents as dimethylacetamide and dimethylformamide.

*Example 12.—Copolymer of alpha-N-methylureidomethyl acrylonitrile and acrylonitrile*

2 g. of alpha-N-methylureidomethyl acrylonitrile and 8 g. of acrylonitrile were added to 100 cc. of water containing 0.2 g. of potassium persulfate and 0.2 g. of sodium bisulfite. Polymerization began immediately and was complete within 12 hours. The precipitated polymer was isolated by filtration. The polymer was soluble in such solvents as dimethylacetamide and dimethylformamide.

By proceeding as set forth in the examples, other copolymers of similar properties can be prepared, for example, from monomeric mixtures containing 10%, 15%, 25%, 30%, 40%, 60%, 70% or 80% by weight of the total unsaturates of one or more of the new monomers of the invention, the remainder of the unsaturates in the mixtures being in each case selected from one or more of the other unsaturates mentioned as suitable for copolymerizing therewith. The copolymers prepared in accordance with the invention can be extruded from their solutions to form flexible filaments suited for spinning into yarns or coated from such solutions to form films suitable as photographic film supports, sheets, etc. Plasticizers, fillers, dyes, etc., can be incorporated into such compositions.

What we claim is:
1. An alpha-ureidomethyl acrylonitrile represented by the general structural formula:

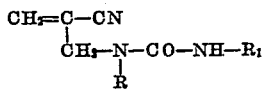

wherein R represents a member selected from the group consisting of a hydrogen atom and the group —CO—NH—R₁, and R₁ represents a member selected from the group consisting of an atom of hydrogen, an alkyl group containing from 1 to 4 carbon atoms, a phenyl group and a tolyl group.
2. Alpha-ureidomethyl acrylonitrile.
3. Alpha-N-methylureidomethyl acrylonitrile.
4. Alpha-N-ethylureidomethyl acrylonitrile.
5. Alpha-N-isopropylureidomethyl acrylonitrile.
6. Alpha-N-n-butylureidomethyl acrylonitrile.
7. A polymer of an alpha-ureidomethyl acrylonitrile represented by the general structural formula:

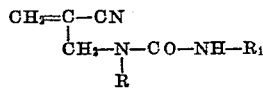

wherein R represents a member selected from the group consisting of a hydrogen atom and the group —CO—NH—R₁, and R₁ represents a member selected from the group consisting of a hydrogen atom, an alkyl group containing from 1 to 4 carbon atoms, a phenyl group and a tolyl group.
8. A copolymer of from 5 to 95% by weight of alpha-N-methylureidomethyl acrylonitrile and from 95 to 5% by weight of acrylonitrile.
9. A copolymer of from 5 to 95% by weight of alpha-N-ethylureidomethyl acrylonitrile and from 95 to 5% by weight of styrene.
10. A copolymer of from 5 to 95% by weight of alpha-N-isopropylureidomethyl acrylonitrile and from 95 to 5% by weight of vinyl acetate.
11. A copolymer of from 5 to 95% by weight of alpha-N-n-butylureidomethyl acrylonitrile and from 95 to 5% by weight of methyl methacrylate.
12. A copolymer of from 5 to 95% by weight of a mixture of alpha-N-ethylureidomethyl acrylonitrile and alpha-N-isopropylureidomethyl acrylonitrile and from 95 to 5% by weight of vinyl chloride.

References Cited in the file of this patent
UNITED STATES PATENTS

| | | |
|---|---|---|
| 2,544,638 | Caldwell | Mar. 13, 1951 |
| 2,606,892 | Kropa | Aug. 12, 1952 |